United States Patent [19]

Kisler

[11] Patent Number: 5,056,646
[45] Date of Patent: Oct. 15, 1991

[54] ELECTROSTATIC-TYPE REGISTRATION SYSTEM

[75] Inventor: Semyon Kisler, Needham, Mass.

[73] Assignee: Polaroid Corporation, Cambridge, Mass.

[21] Appl. No.: 633,015

[22] Filed: Dec. 24, 1990

Related U.S. Application Data

[63] Continuation-in-part of Ser. No. 645,993, Aug. 30, 1984, abandoned, which is a continuation-in-part of Ser. No. 364,658, Apr. 2, 1982, abandoned.

[51] Int. Cl.$^5$ ............................................. B65G 43/00
[52] U.S. Cl. .................................................. 198/341
[58] Field of Search ......................... 198/340, 341, 350

[56] References Cited

U.S. PATENT DOCUMENTS

| | | |
|---|---|---|
| 2,188,871 | 1/1940 | Broekhuysen . |
| 3,234,462 | 2/1966 | Holdsworth .......................... 324/71 |
| 3,427,597 | 2/1969 | Chen .................................... 340/173 |
| 3,437,336 | 4/1969 | Enke et al. ............................ 271/45 |
| 3,666,080 | 5/1972 | Alfredsson ............................ 198/38 |
| 3,977,586 | 8/1976 | Hertrich . |
| 4,402,035 | 8/1983 | Kisler .................................... 361/213 |

FOREIGN PATENT DOCUMENTS

| | | |
|---|---|---|
| 55-24743 | 2/1980 | Japan . |
| 140415 | 11/1980 | Japan .................................. 198/350 |

Primary Examiner—Joseph E. Valenza
Attorney, Agent, or Firm—John J. Kelleher

[57] ABSTRACT

A non-contact type registration system employing dipole-type electrostatic charges for precisely positioning insulative material to a selected location or workstation.

11 Claims, 3 Drawing Sheets

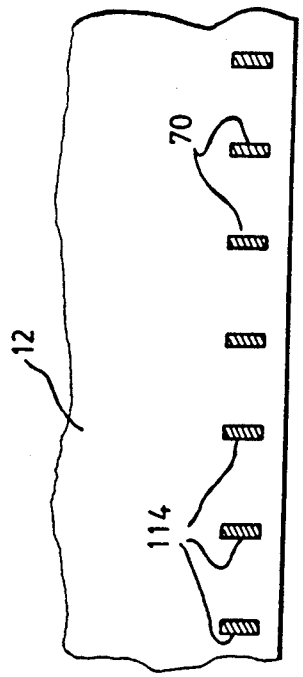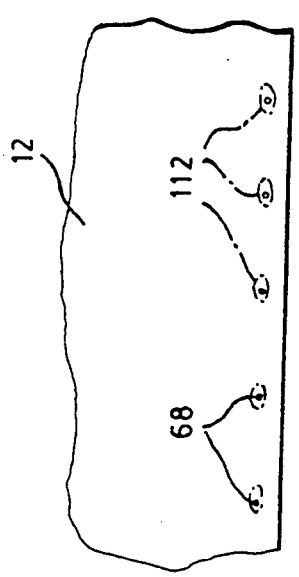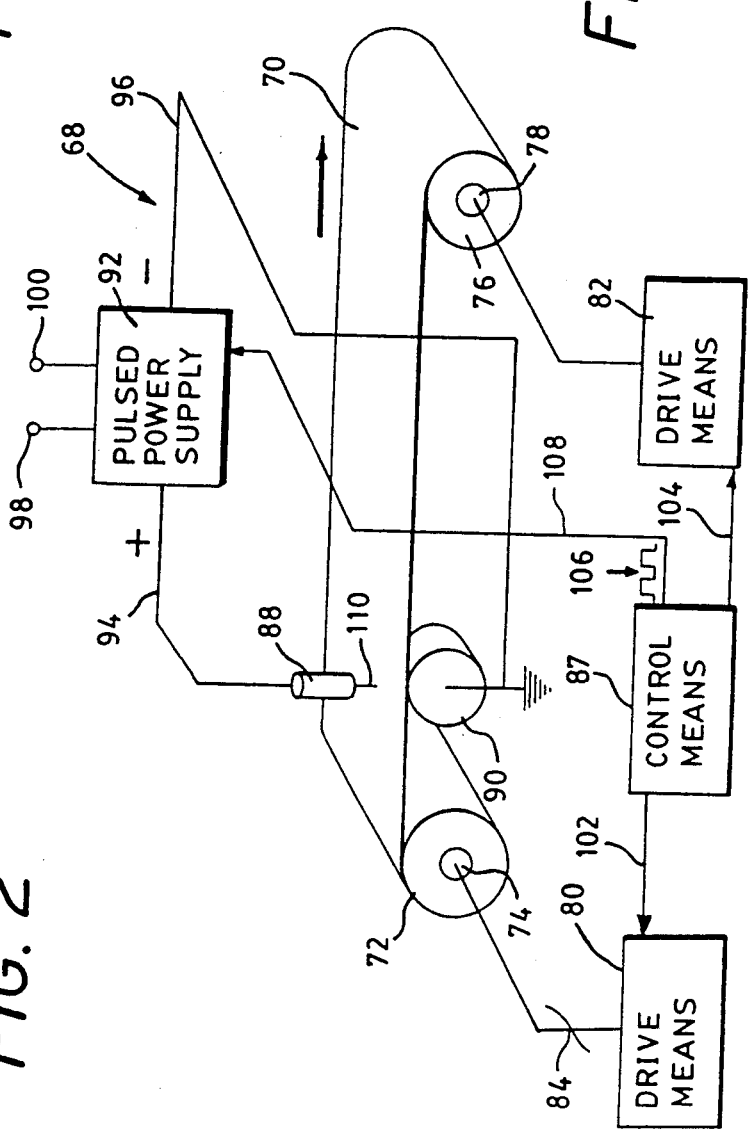

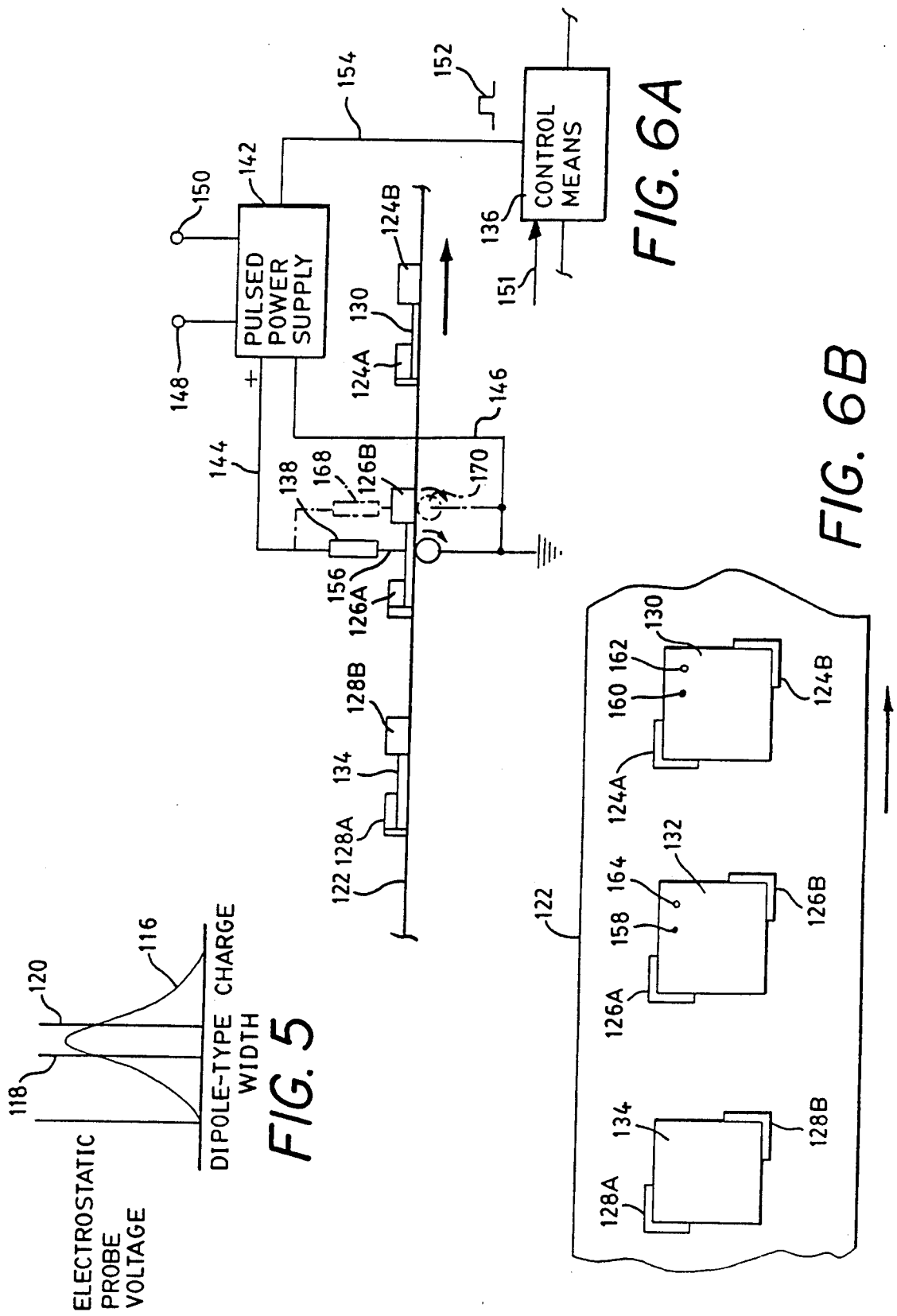

ELECTROSTATIC-TYPE REGISTRATION SYSTEM

RELATED APPLICATIONS

This application is a continuation-in-part of application Ser. No. 06/645,993, filed Aug. 30, 1984 now abandoned, which in turn is a continuation of application Ser. No. 06/364,658, filed Apr. 2, 1982, now abandoned.

BACKGROUND OF THE INVENTION

1. Field of the Invention

The present invention relates to non-contact means for moving insulative material to a selected location, in general, and to an electrostatic charge-controlled material positioning system for precisely positioning such material to an assembly machine workstation, in particular.

2. Description of the Prior Art

Various types of intermittent motion machines are presently available for registration purposes or for positioning portions of a web or individual pieces of material to a selected location or assembly machine workstation with varying degrees of precision. The means for determining when material has been properly positioned to a particular location in these types of machines may be conveniently thought of as falling into either one of two general categories. In one category, physical contact is made between the material to be positioned and the sensing means that determines when the material is positioned to a selected location. In the other category, a material-position determining sensor would sense material position without making physical contact with the material.

In intermittent motion machines incorporating the contact-type sensor mentioned above, the shape of material to be positioned normally is permanently altered in order for it to properly cooperate with the position determining sensor that senses when the material has been positioned to a selected location. Such alterations increase costs in that means must be provided to produce such alterations, and very often more material is required either because of the altered portion of the material being unsuitable for other uses, or having to provide additional materials so that it can be altered for subsequent cooperation with a contact-type material position sensor.

Prior art intermittent motion machines of the non-contact type usually rely on substances being applied to the material to be positioned in order to indicate actual material position. In U.S. Pat. No. 3,977,586 to HERTRICH, for example, light reflecting surfaces are added to the material to be positioned. As suggested in the HERTRICH patent, magnetic material could also be added to the material to be positioned and a magnetic sensor would then be employed to determine when the material had been positioned to the desired location. The addition of such substances to the material to be positioned would also add to overall costs both for providing the substance to be added and for placing it on the material. In addition, that portion of the material on which the substances are deposited may not be available for use in the finished end product which would reduce material yields and thereby increase material costs.

A primary object of the resent invention is to provide apparatus for determining the position of a portion of an insulative material with respect to a selected reference frame or position.

Another object of the present invention is to provide material position determining apparatus that does not physically contact the material for material position-determining purposes.

A further object of the present invention is to provide material positioning apparatus that will not produce permanent physical alterations in the material to be positioned.

Other objects, features and advantages of the present invention will be readily apparent from the following detailed description of a preferred embodiment thereof when taken in conjunction with the accompanying drawings.

SUMMARY OF THE INVENTION

In accordance with the teachings of the present invention, a non-contact type electrostatic registration control system for precisely positioning insulative material to a selected location or assembly machine workstation is disclosed. The system includes apparatus for placing a localized dipole-type electrostatic charges on the material to be positioned. Means are provided for sequentially driving electrostatically charged material or portions of such material to said selected location or workstation in accordance with signals derived from said dipole-type electrostatic charges.

BRIEF DESCRIPTION OF THE DRAWINGS

FIG. 2 is a portion of an insulative web having spaced-apart dipole-type electrostatic charges that were produced therein by the apparatus of FIG. 1B.

FIG. 3 is a portion of an insulative web having spaced-apart dipole type electrostatic charges that were produced therein by the apparatus of FIG. 1C.

FIG. 4 is a schematic diagram of a machine for applying dipole-type electrostatic charges to a web of insulative material.

FIG. 5 is a graph of electrostatic charge-sensing probe voltage as a function of the physical dipole-type charge width.

FIG. 6A shows a portion of a continuous belt positioning system, in elevation, movably supporting a plurality of pieces of insulative material in a particular orientation with each of the pieces having a reference position or a material locating electrostatic dipole-type charge being placed thereon.

FIG. 6B is a top view of a portion of the material positioning apparatus of FIG. 6A.

BRIEF DESCRIPTION OF A PREFERRED EMBODIMENT

Figure 1A:
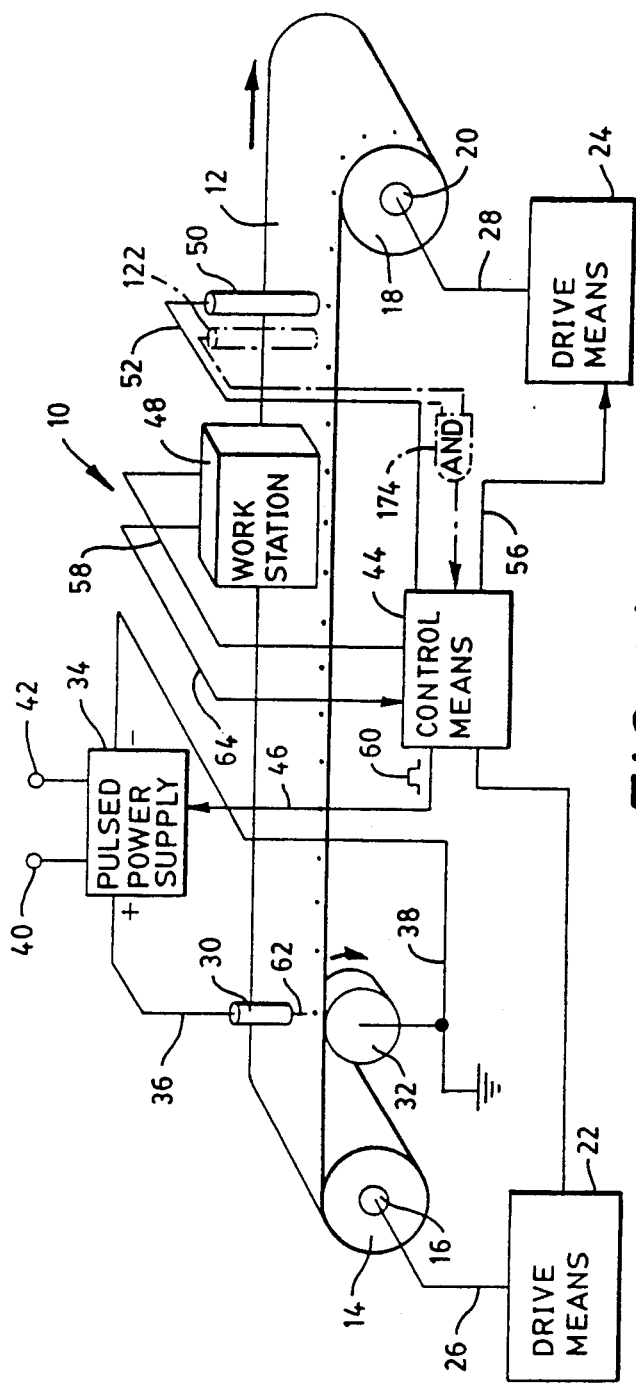
FIG. 1A is a schematic diagram of an insulative web positioning system in accordance with a preferred embodiment of the present invention.

Turning now to the drawings, in FIG. 1A, a schematic diagram of film assembly machine 10 incorporating a preferred embodiment of the insulative material 12 registration or positioning system of the present invention, is depicted. In FIG. 1A, insulative material 12 is in the form of a polyester, teflon, etc., web 4 to 5 mils thick that was previously wound into roll 14 and then placed on rotatably mounted unwind mandrel 16, in a conventional manner. The free end of web 12 was attached to roll 18 which, in turn, was mounted, in a conventional manner, on rotatably mounted rewind mandrel 20. Insulative web 12 is driven from roll 14 onto roll 18 by drive means 22 and 24 which are mechanically coupled to rolls 14 and 18 through paths 26 and 28, respectively.

The registration control or material positioning system of the present invention includes a plurality of distinct functional parts that cooperate with one another to provide the ultimate material-positioning function. Each of these functional parts will be described as well as the manner in which they cooperate or interact with other functional parts to provide precise insulative material positioning.

Uniformly spaced dipole-type electrostatic charges are placed on web 12 as it is intermittently moved between electrically conductive electrode 30 and an electrically conductive reference surface in the form of rotatably mounted, electrically conductive cylindrical roller 32 by drive means 22, 24. Electrode 30 is connected to the positive output terminal of pulsed power supply 34 through a path 36 and cylindrical roller 32 is connected to the negative and grounded output terminal of the power supply 34 through a path 38. The input to power supply 34 is connected to a suitable source of electrical energy (not shown) through input terminals 40 and 42. Power supply 34 is pulsed or gated on and off by a control signal from control means 44 through path 46. Other components of the insulative material positioning system of the present invention, including drive means 22, 24, are also responsive to signals derived by said control means 44.

Workstation 48 performs a particular film assembly operation such as cutting, attaching material, etc., on a portion of insulative material or web 12 after the web portion has been moved into the workstation 48 by the drive means 22, 24. As mentioned above, drive means 22, 24 are responsive to signals derived by control means 44. Control means 44 derives such signals in response to various input signals form various assembly machine 10 sensors. With respect to the operation of the positioning of a portion of web 12 within workstation 48, electrostatic charge-sensing probe 50 is positioned on machine 10 over and in relatively close proximity to one edge of web 12 such that it is capable of sensing the dipole charges placed on the web 12 by electrode 30. Probe 50 is shown positioned downstream of workstation 48 in the direction of web 12 movement but could be located upstream of or within the workstation 48. When probe 50 senses a charge on web 12, it generates a signal representative of the presence of such a charge which is then routed to control means 44 through path 52. Upon receiving a signal from probe 50, control means 44 transmits a drive termination signal from probe 50, control means 44 transmits a drive termination signal to drive means 22, 24 through paths 54, 56, respectively, causing drive means 22, 24 to stop a particular portion of web 12 within workstation 48, a portion of web 12 that is directly related to the physical distance between electrostatic charge-sensing probe 50 and the workstation 48.

Figure 1C:
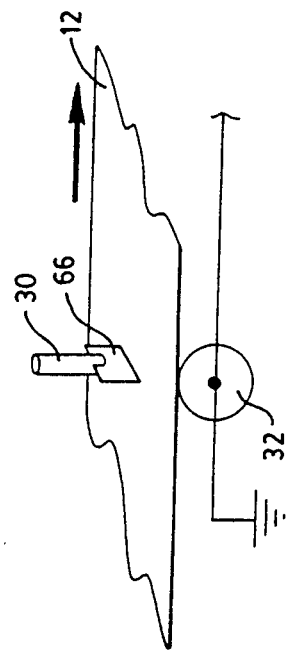
FIG. 1C is a detail of an alternative embodiment of the charge-producing portion of the web positioning system depicted in FIG. 1B.
Figure 1B:
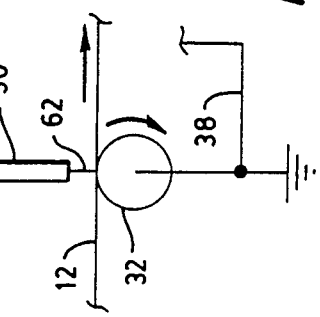
FIG. 1B is a detail of the electrostatic charge-producing portion of the preferred embodiment of the web positioning system shown in FIG. 1A.

After control means 44 transmits a stop signal to drive means 22, 24 through paths 54, 56 respectively, the control means 44 transmits an enable signal to workstation 48 through path 58 which causes workstation 48 to initiate a particular film assembly operation on web 12. At the same time that workstation 48 is enabled to perform an operation on web 12, control means 44 transmits on/off or gating pulse 60 to power supply 34 through path 46. Referring additionally to FIG. 1B, gating signal 60 causes power supply 34 to momentarily apply an approximately 1,500 VDC potential between electrode 30 and reference surface 32. The end of electrode 30 is in the form of a 25 mil diameter stainless steel needle 62 whose free end has an extremely small radius of curvature (approaches zero), has the free end spaced approximately 3-15 mils from web 12. The application of 1,500 VDC between electrode 30 and reference surface 32 produces a relatively intense electrostatic field between these two electrodes. With an edge of web 12 being positioned between needle 62 and reference surface 32 and with 1,500 VDC being established by power supply 34 between needle 62 and reference surface 32, a relatively small area of about 4 to 5 mil of the web 12 will acquire a dipole-type electrostatic charge of approximately 1,000 V. A dipole-type charge is one of long duration and, therefore, its charge level will not change over extremely long (months) periods of time.

The voltage applied between the electrode 30 and the reference surface 32 which produces the relatively intense electrostatic field therebetween must be less than a magnitude required to produce a corona. A corona may generate visible light of sufficient magnitude to be harmful to the material to which a dipole-type charge is to be applied, or generate ozone which may be objectional to personnel in the vicinity thereof. If, for example, the material is photosensitive film, the visible light may cause premature film exposure (fogging) and thereby render such material worthless. A corona is defined herein as the ionization potential or voltage at which ions acquire enough energy to leave the electrode 30 and thereby cause visible light to be generated in the vicinity thereof. The theoretical ionization potential for most electrical conductors under normal atmospheric conditions including normal temperature and pressure is approximately 4600 VDC. The 1500 VDC applied herein between the electrodes 30 and 32 is well below this magnitude and does not produce visible light.

When workstation 48 has completed its assembly operation on that portion of web 12 that is associated with the dipole charge on web 12 that cause control means to generate signals controlling drive means 22, 24, workstation 48 and power supply 34, the workstation 48 transmits a signal to control means 44 through path 64 indicating to the control means 44 that another portion of the web 12 should be moved into workstation 48 so that an assembly operation can be performed on this other web portion. When control means 44 receives this sequence initiating signal from workstation 48 through path 64, control means 44 transmits drive signals to drive means 22, 24 through paths 54, 56, respectively, causing the drive means 22, 24 to move an additional portion of web 12 into workstation 48 as determined by the dipole-type charge associated with the additional web 12 portion that is sensed by electrostatic charge sensing probe 50. This type of movement of discrete portions of web 12 into workstation 48 is repeated for all subsequent portion of insulative web 12 on which the same assembly operation is to be performed on web 12 by the workstation 48.

In a web-handling assembly machine such as machine 10 shown in FIG. 1A, it is sometimes difficult to either physically align or to maintain the alignment between charge-sensing probe 50 and the relatively small-area dipole-type spaced-apart electrostatic charges located along one edge of a web of insulative material as the web moves toward the probe 50. If such alignment problems should occur, they can be overcome by changing the shape of the electrode employed to place a dipole-type charge on the insulative web. With reference to FIGS. 1A, 1B and 1C, if needle end 62 of electrode 30 of machine 10 in FIGS. 1A and 1B is replaced by an electrically conductive stainless steel blade such as blade 66 in FIG. 1C, the dipole-type electrostatically charged area produced on the web by the blade 66 will be in the form of a straight line that is preferably oriented at right angles to an edge of the web 12. A schematic diagram of the spaced-apart dipole-type electrostatically charged areas that would appear along one edge of web 12 if the electrode employed to produce such a charge terminated in needle 62 as shown in FIGS. 1A and 1B are shown in FIG. 2 as circular spots 68. Whereas the spaced-apart dipole-type electrostatically charged areas that would appear along another portion of one edge of web 12 if the electrode employed to produce such a charge terminated in thin blade 66 as shown in FIG. 1C is shown in FIG. 3 as narrow lines 70. By employing blade 66 in machine 10 as the termination of electrode 30 to produce narrow line dipole-type charged areas in web 12, considerable lateral movement of charge-sensing probe 50 with respect to web 12 can be tolerated before the precise positioning of various portions of web 12 into work station 48 is adversely affected.

In assembly machine 10 reference position generating dipole-type electrostatic charges are placed on moving web 12 in the machine 10 a short time before they are sensed by charge-sensing probe 50 for web 12 to workstation 48 positioning or registration purposes. As noted above, the magnitude of a dipole-type charge in an insulative web will remain fairly constant for very long periods of time. Depending upon the type of insulative material involved, it is not unusual for dipole-type electrostatic charges to retain their charge magnitude over a period of several months. In light of this fact, an alternate preferred embodiment of the present invention would be to place dipole-type electrostatic charges on an insulative web in a separate web charging operation long before the web is placed in a machine for assembly purposes, and then store the charged web for an extended period of time before the web is utilized. Web charging machine 68 schematically illustrated in FIG. 4 is a machine whose sole function is to place spaced-apart, reference position generating, dipole-type charges on a web of insulative material.

Referring now to FIG. 4, in charging machine 68 insulative material 70 in the form of a polyester teflon, etc., web 5 mils thick was previously wound into roll 72 and then placed on rotatably mounted unwind mandrel 74, in a conventional manner. The free end of web 70 was attached to roll 76 which, in turn, was also mounted in a conventional manner on rotatably mounted rewind mandrel 78. Insulative web 70 is driven from roll 72 onto roll 76 by drive means 80 and 82 which are mechanically coupled to the rolls 72, 76 through path 84, 86, respectively, in response to drive signals from control means 87.

Spaced-apart, dipole-type electrostatic charges are placed on web 70 as it is moved between electrically conductive electrode 88 and an electrically conductive reference surface in the form of rotatably mounted, electrically conductive cylindrical roller 90 by the drive means 80, 82. Electrode 88 is connected to the positive output terminal of pulsed power supply 92 through path 94 and cylindrical roller 90 is connected to the negative and grounded output terminal of said power supply 92 through path 96. The input to power supply 92 is connected to a suitable source of electrical power (not shown) through input terminals 98 and 100. The charging of web 70 is initiated shortly after control means 87 transmits drive signals to drive means 80, 82 through paths 102 and 10, respectively. After drive signals have been transmitted to drive means 80, 82, power supply 92 is pulsed or gated on and off by gating pulses 106 from control means 87 through path 108. Gating pulses 106 cause power supply 92 to apply a DC potential between electrode 88 and reference surface 90 in the form of a train of 1,500 VDC voltage pulses. This 1,500 VDC potential between electrode 88 and reference surface 90 produces an extremely intense electrostatic field between electrode 88 and surface 90 and a series of spaced-apart dipole-type charges along one edge of moving web 70 whose spacing is determined by the rate of web 70 movement and the rate at which power supply 70 is being gated by control means 87. The end of electrode 88 terminates in stainless steel needle 110 having the same physical dimensions as needle 62 shown in drawing FIGS. 1A and 1B. Inasmuch as dipole-type charges are applied to web 70 while the web 70 is in motion, this tends to lengthen or enlarge the physical size of the charged areas. This is so whether electrode 88 has a needle end as shown in FIG. 4 or terminates in a blade as shown in drawing FIG. 1C. A needle-ended electrode would produce elongated charged areas 112 if the web charging apparatus of FIG. 4 was employed which, for the sake of convenience only are shown (dashed) on web 12 in drawing FIG. 2. A blade-ended electrode would produce charged areas 114 which, for the sake of convenience, are shown (shaded) on web 12 in drawing FIG. 3. Elongated or enlarged charged areas would normally introduce alignment or registration errors into the web registration or positioning system of the present invention. However, electrostatic probes are presently available for use as, for example, probe 50 in assembly machine 10 shown in FIG. 1A that can look at a very narrow slice or portion of the dipole-charged area on web 12 which would all but eliminate the errors that would otherwise be produced by such charged area enlargement. As shown in FIG. 5, this presently available electrostatic probe could look at a relatively narrow slice of a charged area that is represented by probe voltage curve 116, between, for example, lower limit 118 of curve 116 and upper limit 120.

Instead of positioning a portion of an insulative web to a particular location or workstation for web assembly purposes, the inventive concept of the present invention may also be employed to position articles or discrete pieces of insulative sheets of material to a particular workstation. A dipole-type electrostatic charge may be applied to a specific location or area on the discrete piece of insulative material or reference frame and this charged area would serve as the reference point for reference frame or insulative material positioning. Apparatus for placing a dipole-type electrostatic charge on articles or individual pieces of insulative material to establish a reference point for material positioning purposes is schematically shown in drawing FIGS. 6A and 6B. In FIG. 6A, movably mounted belt 122 has a plurality of spaced-apart material locating fixture pairs 124A and 124B, 126A and 126B, 128A and 128B, etc., having the same size and shape, that are fixedly attached to the movably mounted belt. Fixtures 124A,B, 126A,B, and 128A,B have individual articles or pieces or insulative material 130, 132 and 134 located within the fixtures, respectively. Control means 136 causes conventional indexing type drive means (not shown) similar to that employed in machines 10 and 68 in FIGS. 1A and 4, respectively, to sequentially move individual pieces of insulative material 130, 132, 134, etc., to the same specific location between electrode 138 and rotatably mounted electrically conductive reference surface 140. The positive output terminal of power supply 142 is connected to electrode 138 through path 144 and the negative and grounded output terminal of power supply 142 is connected to reference surface 140 through path 146. Power supply 142 is connected to a suitable source of electrical energy through terminals 148 and 150. After control means 136 has caused its associated drive means to position insulative material 132 to a specific location between electrode 138 and reference surface 140 as determined by a material positioning signal from the associated drive means to control means 136 on path 151, the control means 136 transmits pulse 152 to the power supply 142 through path 154, causing the power supply 142 to apply a DC potential between electrode 138 and reference surface 140 in the form of a 1,500 VDC voltage pulse. The voltage pulse momentarily causes power supply 142 to produce an intense electrostatic field between electrode 138 and reference surface 140 and because electrode 138 terminates in stainless steel needle 156, circular shaped dipole-charge 158 (FIG. 6B) is established in insulative material 132 by the electrostatic field.

Control means 136 and its associated conventional drive mans positions all fixtures on support belt 122 together with individual pieces of insulative material to the same specific location between electrode 138 and surface 140. Fixture 124A,B and insulative material 130 have previously been positioned to the specific location whereat circular shaped dipole charge 160 was applied to the material 130. Fixture 128A,B and insulative material 134 supported therein will be moved into the specific location after the drive means (not shown) associated with control means 136 has moved fixture 126A,B and insulative material 132 away from the location between electrode 138 and surface 140 where dipole-type charge 158 was applied to the insulative material 132.

If it is important that insulative sheets of material 130, 132, etc., not rotate about an axis that is perpendicular to the sheets of material, an additional charged area 162, 164, etc. could be placed on the insulative sheets 130, 132, etc., respectively, by electrodes 168 and 170 (shown dashed in drawing FIG. 6A), the electrodes being electrically connected to electrodes 138 and 140, respectively. This pair of charged areas could be sensed by a pair of electrostatic charge sensors mounted in a specific known location, a pair that could, for example, include sensors 50 and 122 which are shown for convenience only in drawing FIG. 1A. In FIG. 1A, the output of probe or charge sensor 50 could be combined with the output of probe or electrostatic sensor 122 (shown dashed) by means of AND gate 174 (also shown dashed). If a two probe arrangement were employed in, for example, a machine such as assembly machine 10 in drawing FIG. 1A, control means 44 would respond for control purposes only when probes 50 and 122 were sensing separate spaced-apart electrostatic charges on web 12 or on individual sheets of insulative material such as the sheets of material depicted in drawing FIGS. 6A and 6B.

DISCUSSION

The insulative material registration or positioning system of the present invention is one that does not rely on physical contact with or permanent alteration of the material to be positioned, in order to precisely position the material to a particular location. The extremely long duration dipole-type electrostatic charge placed on the insulative material by, for example, electrode 30 in assembly machine 10 that is schematically illustrated in FIG. 1A, primarily results from the alignment or orientation of molecules in portions of the insulative material when it is subjected to a fairly intense electrostatic field such as that periodically established between the electrode 30 and reference surface 22 in the assembly machine 10. As mentioned above, the preferred magnitude of this dipole-type long duration charge is 1,000 V which results when a voltage of 1,500 VDC is established between the electrode 30 and reference surface 32 for a 5 mil polyester teflon, etc., web. Sensing probe 50 on machine 10 in drawing FIG. 1A, which is physically spaced from web 12, can adequately sense a particular charged area of this magnitude on the web without having to make web contact.

The positioning system of the present invention can position insulative materials that are capable of retaining an electrostatic charge for finite periods of time. Included within the definition of insulative materials are both dielectric and semiconductive materials. While many semiconductive materials can maintain an initial charge level for a reasonable length of time, the present invention can be more effectively utilized for the positioning of dielectric materials which can readily hold their initial dipole-type electrostatic charge for many months.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. Apparatus for positioning an article having a dielectric element arranged to move in unison therewith and capable of retaining a long-duration dipole-type electrostatic charge, the article being adapted to be positioned at a selected location for performance of a given operation therewith when a given reference frame of the article is in registration with a given reference frame of the selected location, said apparatus comprising:

means for defining a selected location for the performance of the given operation with the article;
means for conveying the article towards said selected location;
charging means for applying an electric dipole-type electrostatic charge in a limited area at a predetermined location on the element, said charging means including at least a pair of electrodes and a voltage source connected between said electrodes having a magnitude less than that required to produce visible light in the vicinity of at least one of said electrodes, the charge being in a fixed spacial relation to the given reference frames of the article;

sensing means for sensing the electric dipole-type electrostatic charge;

means for mounting said sensing means in a predetermined relation to said given reference frame of said selected location in correspondence with the fixed spacial relation of the limited area charge to the given reference frame of the article and in position to sense the dipole-type electrostatic charge as the article is moved into a given proximity therewith; and control means for controlling the operation of said conveying means to terminate the advancement of the article in accordance with the sensing of the dipole-type electrostatic charge by said sensing means whereby the advancement of the article is terminated when the given reference frame of the article is in registration with said given reference frame of said selected location.

2. The apparatus of claim 1 wherein said means for applying an electrostatic charge includes means for applying a charge to at least a pair of spaced apart portions of said element, and said sensing means includes means for independently sensing electrostatic charges at each of said portions.

3. The apparatus of claim 1 wherein said means for applying an electrostatic charge includes means for applying said charge as a spot charge.

4. The apparatus of claim 1 wherein said means for applying an electrostatic charge includes means for applying said charge as a thin elongated line.

5. The apparatus of claim 1 including a carrier web which is advanced along its longitudinal axis through said selected location, the article being mounted on said web such that the lateral position of the article in said selected location is determined by said web, and the longitudinal position of the article in said selected location is determined by said charged portion in cooperation with said sensing means.

6. Apparatus for positioning a selected section of a web of dielectric material at a given location for performance of a given operation therewith, said apparatus comprising:

means for advancing the web along its longitudinal axis through said given location;

means for applying a limited area electric dipole-type electrostatic charge to a given portion of the web in fixed relation to the selected section thereof, said charging means including at lease a pair of electrodes and a voltage source connected between said electrodes having a magnitude less than that required to produce visible light in the vicinity of at least one of said electrodes;

sensing means for sensing an electric dipole-type electrostatic charge;

means for mounting said sensing means in a predetermined relation with respect to said given location and in a position to sense said limited area dipole-type electrostatic charge on the web as the web is advanced therepast; and control means for controlling operation of said advancing means to terminate advancement of the web in correspondence with the sensing of said electrostatic charge by said sensing means whereby said advancement is terminated when said selected section of the dielectric web is positioned in said given location.

7. The apparatus of claim 6 wherein said means for applying an electrostatic charge includes means for applying said charge as a spot charge.

8. The apparatus of claim 6 wherein said means for applying an electrostatic charge includes means for applying said charge as a thin elongated line charge.

9. The apparatus of claim 8 wherein said line charge extends generally transverse of the web.

10. Apparatus for sequentially advancing selected portions of a dielectric web to a particular location, comprising:

means for applying a plurality of electric dipole-type electrostatic spot charges to spaced-apart portions of the dielectric web, said spot charging means including at least a pair of electrodes and a voltage source connected between said electrodes having a magnitude less than that required to produce visible light in the vicinity of at least one of said electrodes;

means for generating a signal responsive to the presence of each of said electrostatic spot charges at a position related to a selected portion of the dielectric web; and drive means responsive to said electrostatic charge-responsive signal for sequentially positioning each of the selected web portions to said particular location.

11. Apparatus for sequentially advancing a plurality of dielectric materials to a particular material location, comprising:

means for applying an electric dipole-type electrostatic spot charge to a selected portion of each of the materials, said spot charging means including at least a pair of electrodes and a voltage source connected between said electrodes having a magnitude less than that required to produce visible light in the vicinity of at least one of said electrodes;

means for generating a signal responsive to the presence of said electrostatic dipole-type spot charges on each of the plurality of dielectric materials when said materials are positioned to a predetermined chargesensing location; and drive means responsive to said electrostatic charge responsive signal for sequentially positioning each of the plurality of dielectric materials to said particular material location.

* * * * *